United States Patent
Wang

(10) Patent No.: US 8,891,786 B1
(45) Date of Patent: Nov. 18, 2014

(54) SELECTIVE NOTCH FILTERING FOR HOWLING SUPPRESSION

(75) Inventor: Xin Wang, Shanghai (CN)

(73) Assignee: Marvell International Ltd. (BM)

( * ) Notice: Subject to any disclaimer, the term of this patent is extended or adjusted under 35 U.S.C. 154(b) by 661 days.

(21) Appl. No.: 13/081,117

(22) Filed: Apr. 6, 2011

Related U.S. Application Data

(60) Provisional application No. 61/345,449, filed on May 17, 2010.

(51) Int. Cl.
  *H04R 3/02* (2006.01)
  *G10K 15/12* (2006.01)

(52) U.S. Cl.
  USPC ............... 381/93; 381/83; 381/95; 381/96; 381/63; 381/318

(58) Field of Classification Search
  USPC ............... 381/83, 93, 95, 96, 318, 63
  See application file for complete search history.

(56) References Cited

U.S. PATENT DOCUMENTS

| | | | |
|---|---|---|---|
| 4,593,250 A * | 6/1986 | Lucas et al. | 330/107 |
| 6,400,781 B1 * | 6/2002 | Vandendorpe et al. | 375/350 |
| 7,133,529 B2 | 11/2006 | Ura | |
| 7,295,670 B2 | 11/2007 | Abe | |
| 2003/0012388 A1 * | 1/2003 | Ura | 381/66 |
| 2008/0021703 A1 * | 1/2008 | Kawamura et al. | 704/226 |
| 2009/0052691 A1 | 2/2009 | Tatsumi | |
| 2009/0196433 A1 | 8/2009 | Tanaka et al. | |

* cited by examiner

*Primary Examiner* — Duc Nguyen
*Assistant Examiner* — George Monikang

(57) ABSTRACT

Systems, methods, and other embodiments associated with selective notch filtering for howling suppression are described. According to one embodiment, an apparatus includes a howling detector that detects howling by performing a time domain analysis of speech signals to identify a speech signal that may be exhibiting howling and performing frequency domain analysis to confirm that the speech signal is exhibiting howling. The apparatus also includes a suppression selector configured to select a suppression technique, a signal processor configured to process the speech signal according to a selected suppression technique. The apparatus outputs, without suppression-related processing, speech signals that are not identified based on the time domain analysis. In another embodiment a method includes analyzing a speech signal to detect howling and when howling is detected, selecting, based on the howling analysis, a howling suppression technique from a set of howling suppression techniques that includes at least two different howling suppression techniques.

17 Claims, 7 Drawing Sheets

SELECTIVE NOTCH FILTERING FOR HOWLING SUPPRESSION

CROSS REFERENCE TO RELATED APPLICATIONS

This application claims the benefit of U.S. provisional application Ser. No. 61/345,449 filed on May 17, 2010, which is hereby wholly incorporated by reference.

BACKGROUND

"Howling" is a type of audible signal noise that occurs during speech communication when positive feedback occurs between a transmitting device and a receiving device. Some microphones and speech devices employ anti-howling measures that involve notch filtering. However, notch filtering techniques can be expensive to implement in terms of computational resources. Further, in many instances, notch filtering is not the most efficient and effective way to suppress howling.

SUMMARY

In one embodiment an apparatus includes a howling detector that detects howling by performing a time domain analysis of speech signals to identify a speech signal that may be exhibiting howling and performing frequency domain analysis to confirm that the speech signal is exhibiting howling. The apparatus also includes a suppression selector configured to select a suppression technique, a signal processor configured to process the speech signal according to a selected suppression technique. The apparatus outputs, without suppression-related processing, speech signals that are not identified based on the time domain analysis.

In another embodiment a method includes analyzing a speech signal to detect howling and when howling is detected, selecting, based on the howling analysis, a howling suppression technique from a set of howling suppression techniques that includes at least two different howling suppression techniques. The method also includes processing the speech signal according to the selected howling suppression technique and passing the processed speech signal to a receiving device. If howling is not detected, the speech signal is passed to the receiving device without performing a howling suppression technique on the speech signal.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
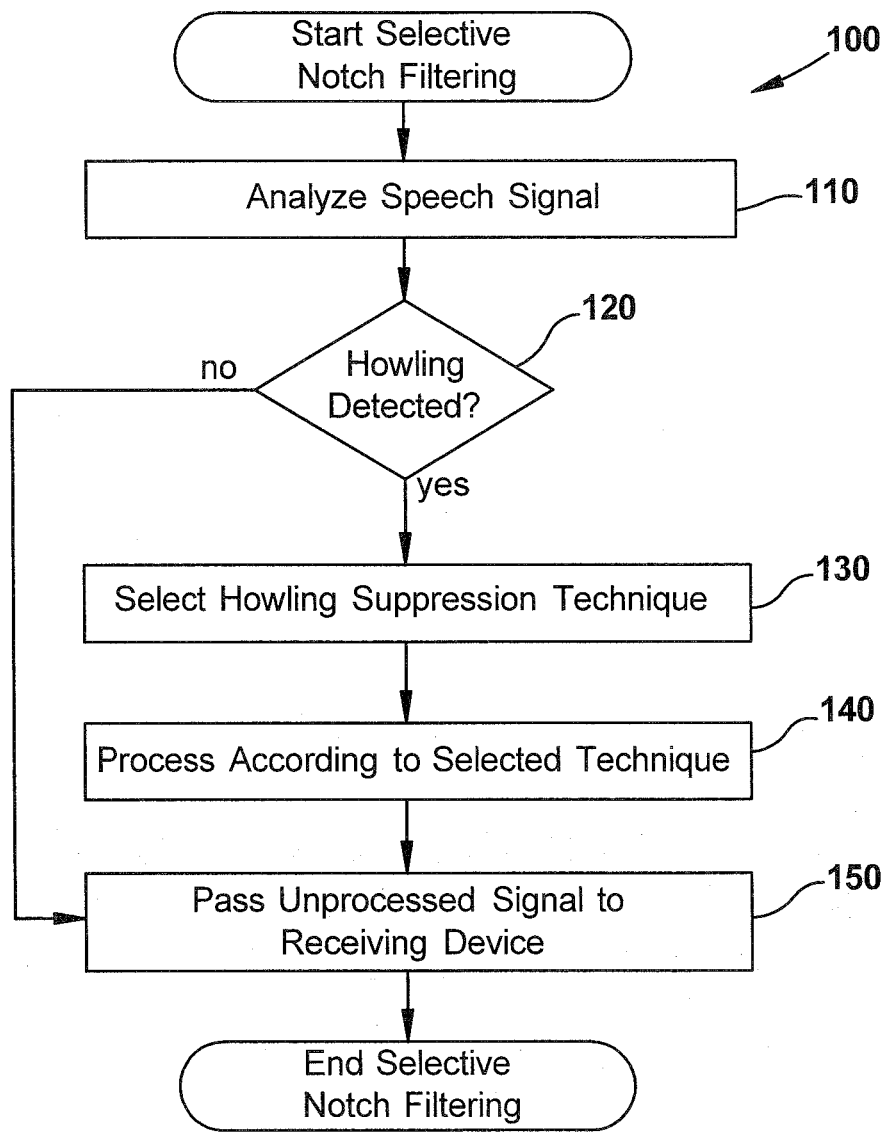
FIG. 1 illustrates one embodiment of a method associated with selective notch filtering for howling suppression.

Described herein are example devices, methods, and other embodiments associated with selectively applying notch filtering techniques to a speech signal to achieve satisfactory howling suppression with low computational complexity. FIG. 1 illustrates one example embodiment of a selective notch filtering method 100. At 110, a speech signal is analyzed. During this analysis, the speech signal is analyzed to determine if it may include howling components. One low complexity howling detection technique includes screening the speech signal by determining a level of symmetry of a time domain representation of the speech signal and then determining an average power energy of any speech signal that is found to be symmetrical. The time domain screening technique is described in more detail in FIG. 2 and its accompanying text. At 120 and 150, speech signals that are determined not to include howling components are passed to a receiving device without being subjected to howling suppression techniques, thereby avoiding unnecessary computations involved with howling suppression.

At 130, speech signals that are determined to include howling components are further analyzed to select a suppression technique. The analysis determines if notch filtering will effectively suppress the howling components. Notch filtering is selected to suppress howling in those speech signals that are identified as suitable for notch filtering while other, more computationally simple, suppression techniques are selected for speech signals having howling components that are not identified as suitable for notch filtering. One computationally simple suppression technique includes inter frame attenuation. An example method for selecting a suppression technique is described in more detail in FIG. 6 and its accompanying text.

The method 100 may also include constructing a notch filter based on an analysis of the speech signal. Example methods for constructing a notch filter based on an analysis of the speech signal are described in more detail in FIGS. 3-5 and their accompanying text. At 140, the speech signal is processed according to the selected suppression technique. The devices and methods described herein selectively apply notch filtering to speech signals that are determined to include howling components that are suitable for notch filtering, rather than applying notch filtering to all speech signals or speech signals that include any type of howling component. This reduces the computational complexity of howling suppression and makes selective notch filtering suitable for many applications, including wireless communication.

Figure 2:
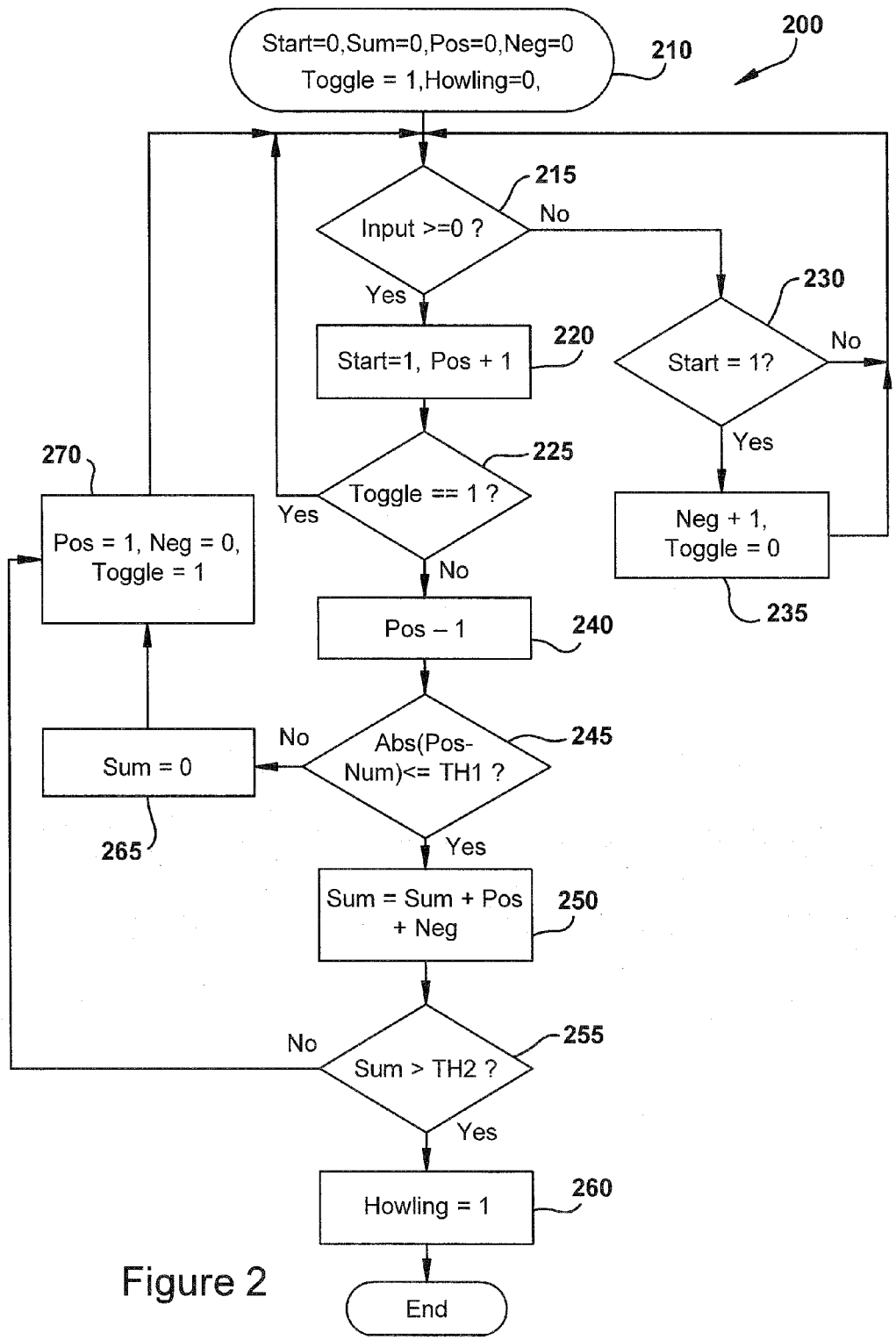
FIG. 2 illustrates one embodiment of a method associated with howling detection in the time domain.

One characteristic of a howling signal component is that its amplitude in the time domain is nearly symmetrical. This observation provides that basis for a simple screening technique for identifying speech signals that may include a howling component. An example embodiment of a screening method 200 for screening speech signals based on symmetry in the time domain is illustrated in FIG. 2. The screening method 200 analyzes a digital time domain speech signal, which includes a set of sequential speech signal samples that represent the speech signal in the time domain.

At 210, several counters and flags are initialized. A Start flag is initialized to 0. The Start counter will be set to 1 after a first positive signal sample is detected. A Sum counter is initialized to 0. The Sum counter is used to count the number of consecutive samples in a speech signal that are determined to be symmetrical. Pos and Neg counters are also initialized to 0, the Pos counter is used to count a number of positive samples in a positive part of the speech signal. The Neg counter is used to count a number of negative samples in the following negative part of the speech signal. A Toggle flag is initialized to 1. The Toggle flag is used to keep track of which part of the speech signal is being analyzed. A Howling flag is initialized to 0. The Howling flag is set to 1 when the speech signal is determined to be symmetrical enough to indicate that the speech signal may include a howling component.

At 215, a speech signal sample is analyzed to determine if it is positive or negative. Until a first positive value is detected, the Start flag is set to 0 so the method loops between 230 and 215 and subsequent samples are analyzed until a positive sample is encountered. At 220 a first positive sample has been encountered and the Start flag is set to 1 and the Pos counter is incremented. At 225, if the Toggle flag is equal to 1, meaning that the positive part of the speech signal is being analyzed, the method loops back to 215 and the next sample is analyzed to determine if it is positive or negative. As subsequent positive samples are encountered, the Pos counter is incremented in 220-225.

When a negative sample is encountered, at 230 the Start flag is examined to determine if at least one positive sample has already been encountered. If the Start flag is set to 1, at 235 the Neg counter is incremented and the Toggle flag is set to 0 to indicate that the negative part of the speech signal is being analyzed. Subsequent negative samples will cause the method to loop through 215, 230, and 235 and the Neg counter is incremented to count the number of negative samples.

When a positive sample is encountered after the negative samples, at 215 the Pos counter is incremented. The toggle flag will have been set to 0 at 235, so the method will move to 240. At 240, the Pos counter is decremented to compensate for the present positive sample which is not part of the full cycle of speech signal that will be analyzed in subsequent steps. At 245, the Neg counter is subtracted from the Pos counter to determine if there are equal numbers of positive samples and negative samples in the full cycle of the speech signal. The difference between the Pos counter and the Neg counter is compared to a first threshold TH1. In one embodiment, TH1 is 2 for narrow band speech signals and 4 for wide band speech signals.

If the difference between the Pos counter and the Neg counter is more than the first threshold, it is determined that the speech signal cycle under analysis is not symmetrical and thus not a candidate for howling. At 265, the Sum counter is reset to zero. At 270, in preparation for analyzing a next cycle of the speech signal, the Pos counter is set to 1 to compensate for the subtraction of 1 at 240. Also at 270 the Neg counter is reset to 0 and the Toggle flag is set to 1 to indicate that a positive half of the speech signal is under analysis. The method returns to 215 where the analysis of the next cycle of speech signal data begins.

At 245, if the difference is less than or equal to the first threshold TH1, it is determined that the speech signal cycle under analysis is symmetrical. At 250, the Pos counter and the Neg counter are added to the Sum counter. At 255, the Sum counter is compared to a second threshold TH2. In one embodiment the value of TH2 is approximately 75% of the number of samples in a speech signal frame. A frame of speech signal data is the number of samples that can be processed at one time in subsequent processing, and will vary depending on hardware bandwidth capabilities. If the Sum counter does not exceed the second threshold TH2 the method continues at 270 with analysis of a subsequent speech signal cycle.

At 255, if the Sum counter exceeds the second threshold TH2 at 260 the howling flag is set to 1 to indicate that the frame is a candidate for howling. Thus, when enough sequential cycles of speech signal data are determined to be symmetrical, howling is detected by the method 200. A speech signal that is not determined to be symmetrical can be passed on to a receiving device without frequency domain analysis or howling suppression, reducing overall computational complexity and cost.

In addition to symmetry in the time domain, another characteristic of a speech signal exhibiting howling is that the average power spectral component of the speech signal is very large. This observation provides the basis for subsequent analysis of speech signals that are determined to be symmetrical in the time domain using the method 200 in FIG. 2. The subsequent analysis is performed in the frequency domain and confirms whether or not the symmetrical speech signal is a "true" howling frame (a frame of speech data that is exhibiting howling).

Figure 3:
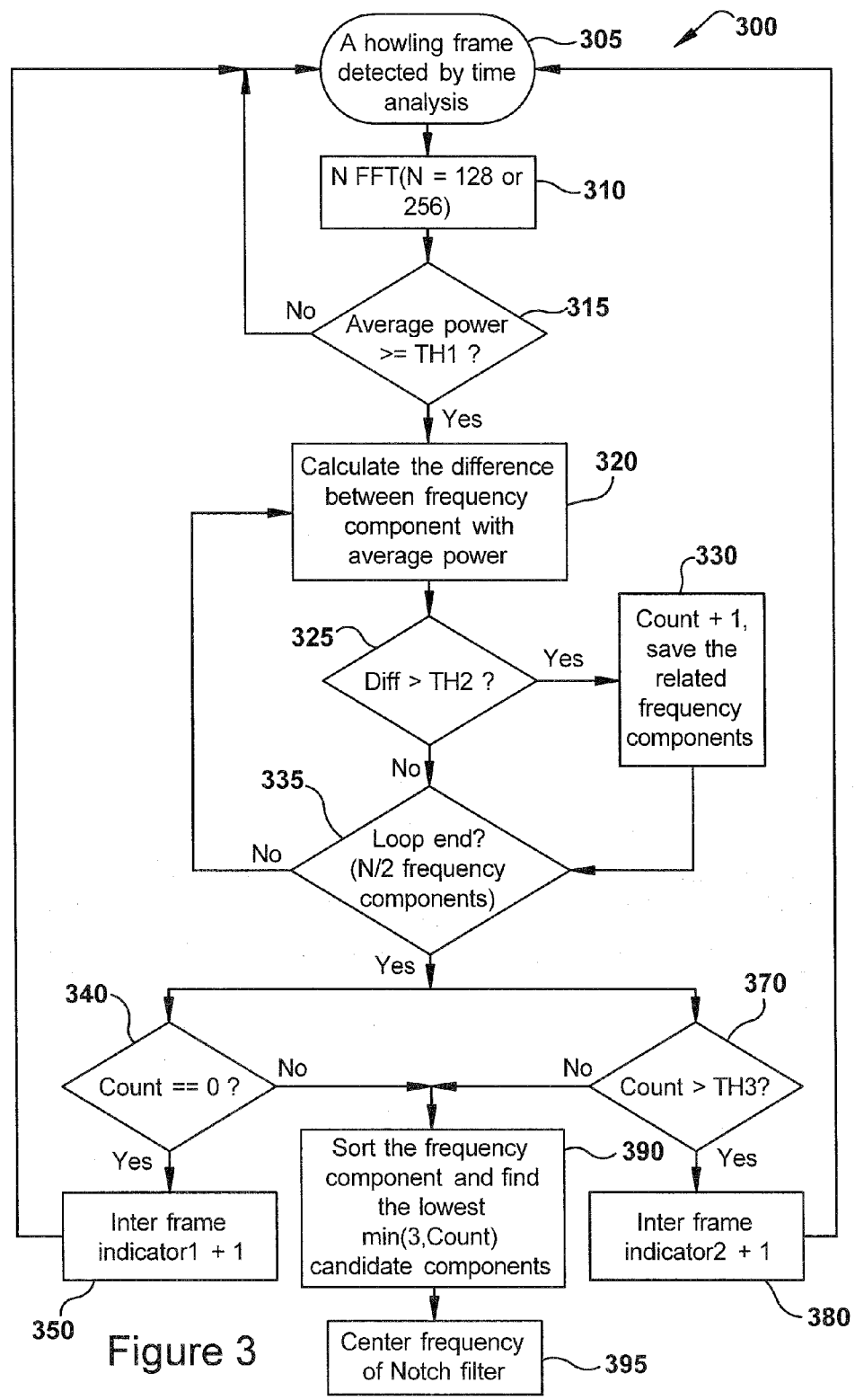
FIG. 3 illustrates one embodiment of a method associated with howling detection in the frequency domain and calculation of a center frequency for a howling-suppressing notch filter.

FIG. 3 illustrates one example embodiment of a notch filter center frequency determination method 300 that performs frequency domain analysis on a frame of speech signal data that has been determined to be symmetrical by the screening method 200 (FIG. 2). At 305 a howling frame that was detected using time domain symmetry analysis is obtained. At 310, a Fast Fourier Transform (FFT) is performed on the frame of speech signal data to obtain a frequency domain representation of the speech signal data. In one example embodiment, the FFT uses 128 points (128 frequency components) for a narrow band signal while 256 points (256 frequency components) are used for a wide band signal.

At 315, the howling frame detected by time domain screening is analyzed based on power spectral amplitude to confirm that the howling frame is a true howling frame. The average power of the frequency components is compared to a threshold TH1. In one embodiment, TH1 is 88 dB. If the average power of the frequency components is less than TH1, it is determined that the frame is not a true howling frame and the method loops back to 310 where another frame of speech data will be analyzed.

If it is determined that the frame is a true howling frame, at 320, the power of each frequency component is compared to the average power of all of the frequency components. At 325 the frequency components whose power amplitude exceeds the average power amplitude by at least a threshold TH2 are identified and stored, as well as their frequency index, at 330. In one example embodiment, the threshold TH2 is 6 dB. At 330 a counter (Count) is incremented when a frequency component with high power spectral amplitude is detected. At 335, the 1~N/2 frequency components will be taken as a loop.

At 340, the counter is compared to 0. If the counter is equal to 0, meaning that no high power frequency components have been identified in the current howling frame, an indicator1 counter is incremented at 350. At 370, the counter is compared to a third threshold TH3. In one embodiment, the third threshold TH3 is 6. If the counter is greater than TH3, meaning that at least TH3 high power frequency components have been detected in the current howling frame, an indicator2 counter is incremented at 380. The indicator1 and indicator2 counters will be used in a suppression selection method that is described in FIG. 6 and its accompanying text.

Figure 6:
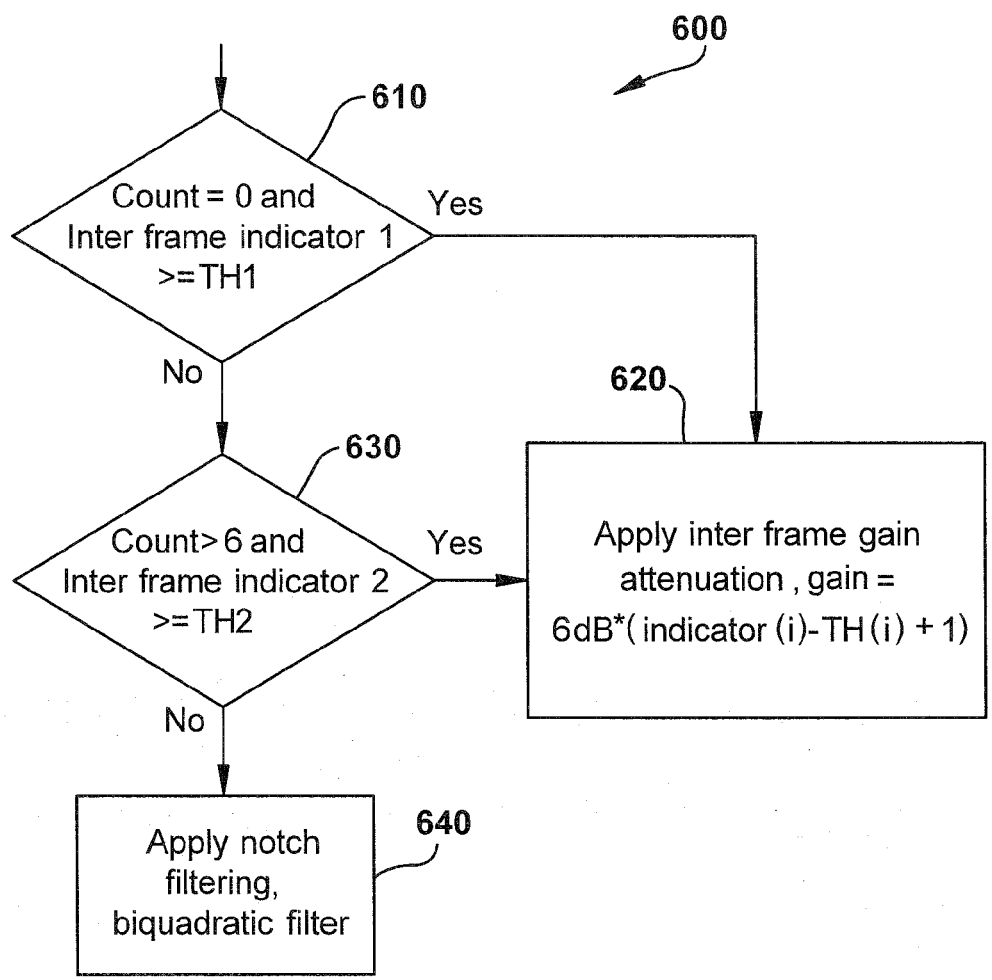
FIG. 6 illustrates one embodiment of a method associated with selecting notch filtering or attenuation for howling suppression.

As will be seen in FIG. 6, inter frame attenuation is selected for howling frames of speech data that have zero high power frequency components or more than TH3 high power frequency components. This is because, in the case of zero high power frequency components, the central frequency of a notch filter cannot be calculated precisely. In the case of more than TH3 high power frequency components, notch filtering will not provide sufficient additional suppression benefits to justify the computational cost associated with notch filtering.

If the number of high power frequency components in a frame is between greater than 0 but less than or equal to TH3, one or more bi-quadratic filters will be constructed according to the following formula:

$$H_l(q, t) = \frac{b_l^{(0)}(t) + b_l^{(1)}(t)q^{-1} + b_l^{(2)}(t)q^{-2}}{1 + a_l^{(1)}(t)q^{-1} + a_l^{(2)}(t)q^{-2}}$$

Figure 4:
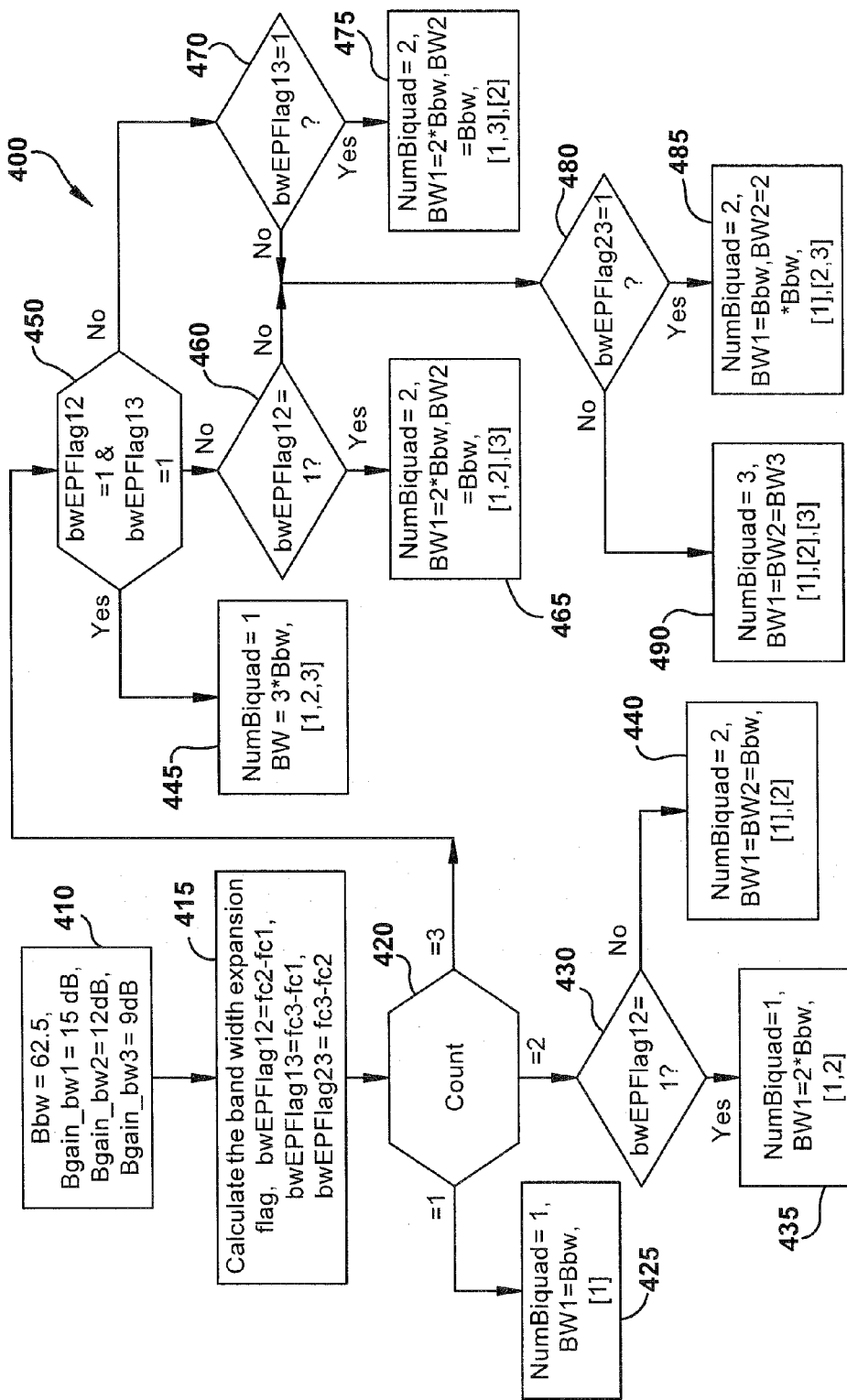
FIG. 4 illustrates one embodiment of a method associated with calculation of bandwidth for howling-suppressing notch filters and selection of a number of howling-suppressing notch filters.

To construct a notch filter according to the above formula, the center frequency, bandwidth, and notch gain need to be determined. The gain at band edges is deemed to be constant. In one embodiment, the center frequencies of the notch filters are determined as illustrated in FIG. 3. In one embodiment, the bandwidths are determined as illustrated in FIG. 4. In one embodiment, the notch gains are determined as illustrated in FIG. 6.

Returning to FIG. 3, at 390, after sorting the frequency components according to power spectral amplitude, up to three frequency components will be stored with their amplitude and frequency index. In one embodiment, the sorting algorithm is a bubble sort. For example, if the number of high frequency components is 2, at 395 the index of these two frequency components which are the first and second largest in terms of power spectral amplitude, are selected as center frequencies for notch filters. The center frequencies are used by a notch filter construction method shown in FIG. 4. The number of center frequencies and corresponding notch filters is limited to three to limit the computational complexity of the methods described herein. A greater or lesser number of center frequencies may also be chosen depending on particular design considerations.

FIG. 4 illustrates an example embodiment of a bandwidth setting method 400 that determines, based on the center frequencies selected in FIG. 3, a number of notch filters to construct and a gain and bandwidth for the notch filters. For the purposes of this description, the first center frequency is the lowest of the center frequencies and the third center frequency is the highest of the center frequencies. The bandwidth setting method 400 determines whether any of the center frequencies are close enough to one another that a single notch filter with an expanded bandwidth could be constructed to suppress howling at more than one center frequency. At 410, a baseline bandwidth (Bbw) of 62.5 dB is set based on the formula (fs/2)/(N/2) where fs is the sample rate of the speech signal and N is the FFT point. Bgain_bw1 represents a notch filter with a baseline gain and baseline bandwidth. Bgain_bw2 represents a notch filter with baseline gain and two baseline bandwidth expansion. Bgain_bw3 represents a notch filter with baseline gain and three baseline bandwidth expansion. In this embodiment, Bgain_bw1 is set to 15 dB, Bgain_bw2 is set to 12 dB, and Bgain_bw3 is set to 9 dB. Other suitable values for the first, second, and third bandwidth gains may be used.

At 415, bandwidth expansion flags that correspond to the differences between the three center frequencies are calculated. A first bandwidth expansion flag bwEPFlag12 corresponds to the distance between a first center frequency and the second center frequency. A second bandwidth expansion flag bwEPFlag13 corresponds to the distance between the first center frequency and the third center frequency. A third bandwidth expansion flag bwEPFlag23 corresponds to the distance between the second center frequency and the third center frequency.

At 420, the Count counter, which counts the number of center frequencies determined by the method in FIG. 3, is compared to a given number. If Count is equal to 1, at 425 a single bi-quadratic notch filter is constructed with a bandwidth equal to the base bandwidth. At 420, if Count is equal to 2, at 430 the first bandwidth expansion flag is compared to 1. If the first bandwidth expansion flag is equal to 1, the two center frequencies are close enough to one another to be suppressed by a single notch filter. Thus, at 435 a single notch filter is constructed having the first (lower of the two center frequencies) center frequency, a bandwidth twice the baseline bandwidth and a gain equal to Bgain_bw2.

At 430, if the first bandwidth expansion flag is not equal to 1, the two center frequencies are not close enough to one another to be suppressed by a single notch filter. Thus, at 440, two notch filters are constructed having the first and second center frequencies, respectively. Each notch filter will have a bandwidth equal to the baseline bandwidth and a gain equal to Bgain_bw1.

At 420, if the Count counter is equal to 3, at 450 the first and second bandwidth expansion flags are compared to 1. If both flags are equal to 1, then the three center frequencies are close enough to one another to be suppressed by a single notch filter. Thus, at 455 a single notch filter is constructed having the second center frequency, a bandwidth three times the baseline bandwidth and a gain equal to Bgain_bw3.

At 460, if only the first bandwidth expansion flag is equal to 1, the first and second center frequencies are close enough to one another to be suppressed by a single notch filter, while the third center frequency is not. Thus, at 465, two notch filters are constructed having the first and third center frequencies, respectively. The first notch filter (for the first and second center frequencies) will have a bandwidth equal to twice the baseline bandwidth. The second notch filter will have a bandwidth equal to the baseline bandwidth. The notch filters will have gains equal to Bgain_bw2 and Bgain_bw1, respectively.

At 470, if only the second bandwidth expansion flag is equal to 1, the first and third center frequencies are close enough to one another to be suppressed by a single notch filter, while the second center frequency is not. Thus, at 475, two notch filters are constructed having the first and second center frequencies, respectively. The first notch filter (for the first and third center frequencies) will have a bandwidth equal to twice the baseline bandwidth. The second notch filter will have a bandwidth equal to the baseline bandwidth. The notch filters will have gains equal to Bgain_bw2 and Bgain_bw1, respectively If the neither first bandwidth expansion flag nor the second bandwidth expansion flag is equal to 1, at 480 the third bandwidth expansion flag is compared to 1. If the third bandwidth flag is equal to 1, the second and third center frequencies are close enough to one another to be suppressed by a single notch filter, while the first center frequency is not. Thus, at 485, two notch filters are constructed having the first and second center frequencies, respectively. The first notch filter will have a bandwidth equal to the baseline bandwidth. The second notch filter (for the second and third center frequencies) will have a bandwidth equal to twice the baseline bandwidth. The notch filters will have gains equal to Bgain_bw2 and Bgain_bw1, respectively. If the third bandwidth flag is equal to 0, at 490, three notch filters are constructed having the first, second, and third center frequencies, respectively. Each notch filter will have a bandwidth equal to the baseline bandwidth and a gain equal to Bgain_bw1.

Figure 5:
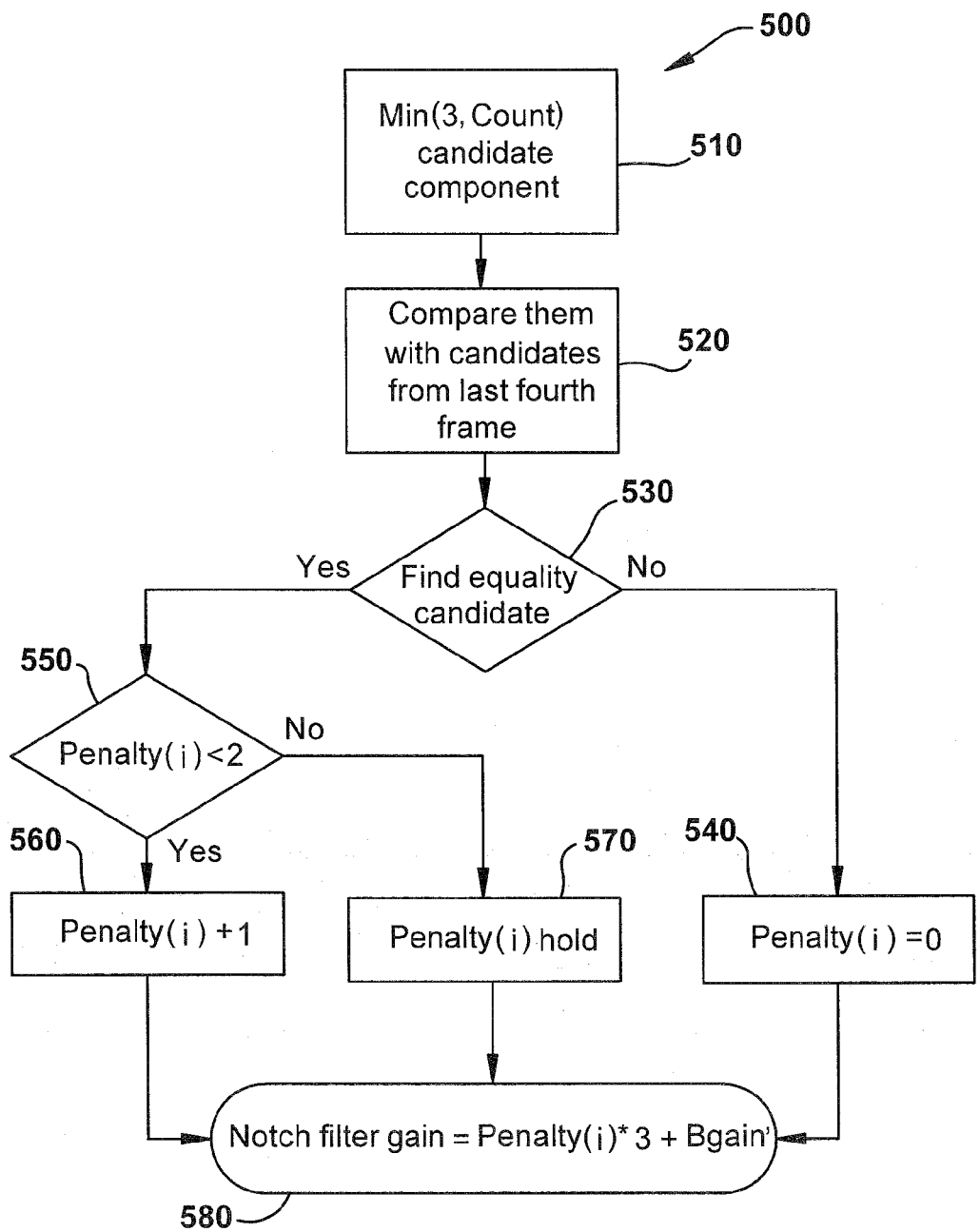
FIG. 5 illustrates one embodiment of a method associated with calculation of gain for howling-suppressing notch filters.

FIG. 5 illustrates an example embodiment of a gain adjustment method 500 that increases the gain of the notch filter(s) if howling continues. At 510 the high power frequency components that were used to construct the notch filter are identified in a present frame of speech signal data. They are also the output of 390 of FIG. 3. At 520, the index of those frequency components is compared to the corresponding high power frequency component in a preceding frame. In the embodiment illustrated in FIG. 5, the high power frequency components are compared to corresponding components from a last fourth frame. This is because there is a delay between transmitting and receiving of approximately four frames. In other systems, a different preceding frame may serve as the basis for the comparison. At 530, if the index is not the same between the present and preceding frame frequency component, meaning that the howling is being effectively suppressed in this frequency component, a penalty is set to 0. In this instance at 580 the gain of the notch filter remains at the base gain.

If the index is the same between the present and preceding frame frequency component, meaning that the howling is not being effectively suppressed, the value of the penalty is compared to 2 at 550. If the penalty is less than 2, at 560 the penalty is incremented. At 580 the gain of the notch filter is increased by three times the penalty value. At 550 if the penalty is not less than 2, at 570 the penalty value is maintained and at 580 the notch filter gain remains at the increased value. Thus, the method 500 adjusts the gain upward to a maximum allowable filter gain, which may be selected according to various design considerations.

FIG. 6 illustrates an example embodiment of a suppression technique selection method 600. The method 600 inputs the value of the Count counter and indicator1 and indicator2 counters from the notch filter center frequency determination method illustrated in FIG. 3. At 610, if the Count counter equals 0 and the indicator1 counter is greater than or equal to a first threshold TH1, at 620 inter frame gain attenuation is selected. In one embodiment, TH1 is set to 2. The gain of the attenuation is determined by the difference between the indicator1 counter and TH1 increased by 1 and multiplied by 6 dB.

At 630 if the Count counter is greater than 6 and the indicator2 counter is greater than or equal to a second threshold TH2, inter frame gain attenuation is selected. In one embodiment, TH2 is set to 5. The gain of the attenuation is determined by the difference between the indicator2 counter and TH2 increased by 1 and multiplied by 6 dB. At 640, if neither of the criteria set forth in 610 or 630 is met, notch filtering is selected for howling suppression.

Figure 7:
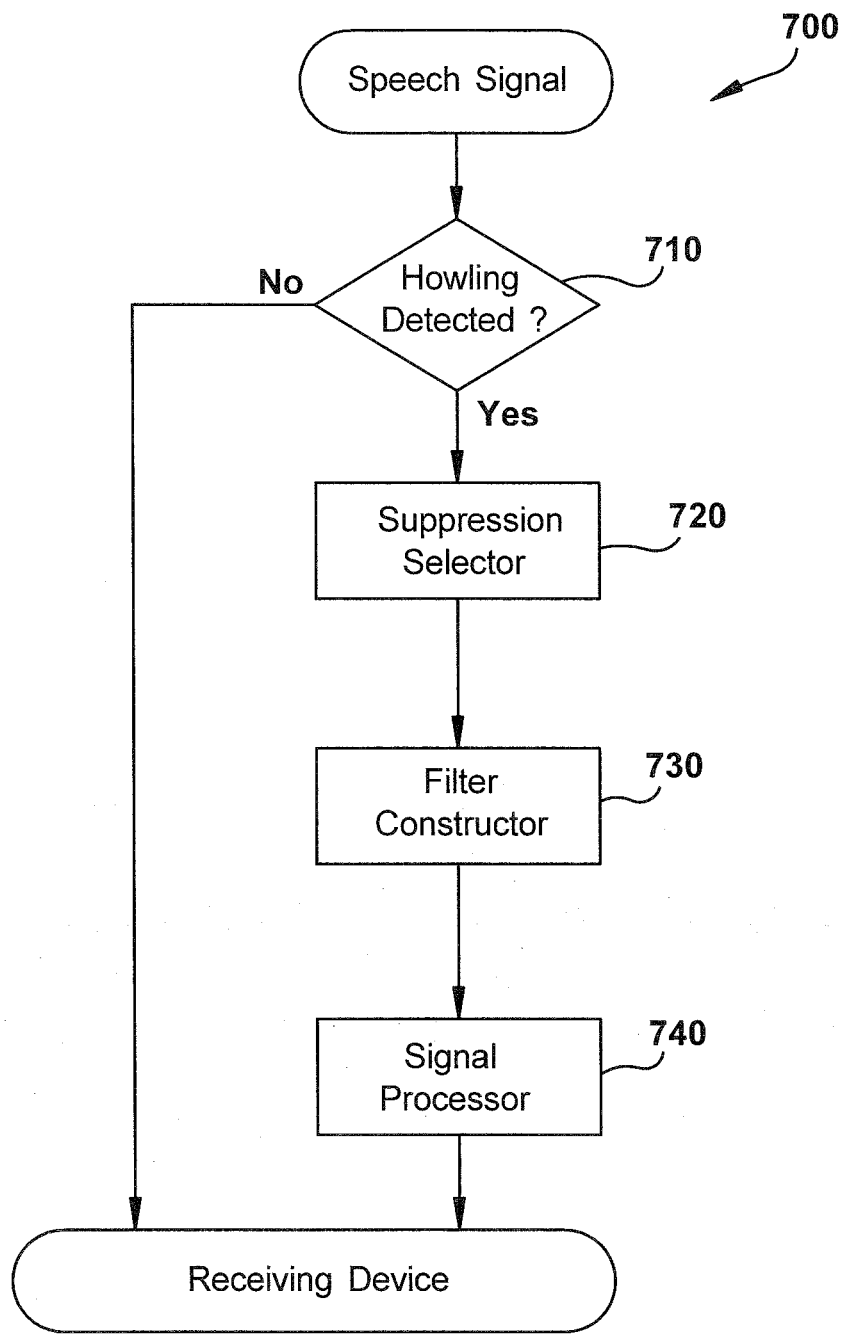
FIG. 7 illustrates one embodiment of an apparatus associated with selective notch filtering for howling suppression.

FIG. 7 illustrates an example embodiment of an apparatus 700 that performs selective notch filtering to suppress howling. The apparatus 700 includes a howling detector 710 configured to perform time and frequency domain analysis of a speech signal. The howling detector 710 detects howling based on a frequency domain analysis of speech signals identified as possible howling frames by the time domain analysis. The howling detector 710 may detect howling in the speech signal based on the symmetry of a time domain representation of the speech signal. The howling detector 710 also performs a frequency domain analysis on the speech signal to confirm that howling is present in speech signals exhibiting symmetry in the time domain. Speech signals in which howling is not detected are passed to a receiving device without further suppression-related processing.

A suppression selector 720 is configured to select a suppression technique for use in suppressing howling detected by the howling detector. In one embodiment, the suppression selector selects either inter frame attenuation or notch filtering depending on frequency domain characteristics of the speech signal. The suppression selector 720 may be configured to count a number of high power frequency components in the frequency domain of the speech signal that have a peak power greater than an average signal power. In this embodiment, the suppression selector 720 selects notch filtering when the number of high power frequency components falls within a predetermined notch filtering range and inter frame attenuation when the number of high power frequency components falls outside the predetermined notch filtering range in several continuous frames.

In some embodiments, the apparatus 700 includes a filter constructor 730 configured to construct a filter to suppress the howling when the howling suppression selector 720 selects a suppression technique of filtering. The filter constructor 730 constructs the filter based, at least in part, on the analysis of the speech signal. The filter constructor 730 may be configured to compares frequencies of the high power frequency components and constructs a single notch filter having a center frequency corresponding to the frequency component of the current howling speech signal having the largest power spectral amplitude and a predetermined bandwidth. The filter constructor 730 may be configured to construct a notch filter having an expanded bandwidth that is greater than the predetermined bandwidth when the frequencies are within a threshold frequency range of each other.

The apparatus 700 includes a signal processor 740 configured to process the speech signal according to the selected howling suppression technique and passing the processed speech signal to a receiving device In one embodiment, the apparatus 700 is an integrated circuit device with digital filtering capabilities that processes speech signals to suppress howling. In this embodiment, the howling detector includes processor-executable instructions stored on a non-transitory processor-readable medium for analyzing a time domain representation speech signal to detect howling based, at least in part, on a level of symmetry of the time domain representation of the speech signal. The instructions also include performing a frequency domain analysis to confirm the presence of howling in speech signals determined to be symmetrical in the time domain. The suppression selector includes processor-executable instructions stored on a non-transitory processor-readable medium for selecting a howling suppression technique based, at least in part, on the analyzing of the speech signal in the frequency domain.

In this embodiment, the filter constructor 730 includes processor-executable instructions stored on a non-transitory processor-readable medium for constructing a bi-quadratic notch filter based, at least in part, on characteristics of the speech signal. The signal processor 740 includes processor-executable instructions stored on a non-transitory processor-readable medium for processing the speech signal according to the selected howling suppression technique and passing the processed speech signal to a receiving device.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a howling detector configured to detect howling by:
        performing a time domain analysis of speech signals to identify a speech signal that may be exhibiting howling; and
        performing frequency domain analysis of the identified speech signal to confirm that the speech signal is exhibiting howling;
    a suppression selector configured to select a suppression technique for use in suppressing howling detected by the howling detector, wherein the suppression selector is configured to select inter frame attenuation when a number of high power frequency components falls outside a predetermined notch filtering range;
    a signal processor configured to process the speech signal according to the selected suppression technique; and
    wherein the apparatus outputs, without suppression-related processing, the speech signals that are not identified based on the time domain analysis.

2. The apparatus of claim 1, wherein the howling detector is configured to analyze a level of symmetry of the speech signal in the time domain and to detect howling when the speech signal exhibits a threshold level of symmetry.

3. The apparatus of claim 1, wherein the suppression selector is configured to select the suppression technique from a set of suppression techniques that includes notch filtering and the inter frame attenuation.

4. The apparatus of claim 1, wherein the time domain analysis is performed using a Fast Fourier Transform (FFT); the selected suppression technique is notch filtering; and the predetermined range is a predetermined notch filtering range.

5. The apparatus of claim 1, comprising a filter constructor configured to construct a filter to suppress the howling when the suppression selector selects the suppression technique of filtering and wherein the filter constructor constructs the filter based, at least in part, on the analysis of the speech signal.

6. The apparatus of claim 5, wherein the filter constructor is configured to construct at least one notch filter having a center frequency that corresponds to a frequency component having a largest power spectral amplitude and a predetermined bandwidth.

7. The apparatus of claim 5, wherein the filter constructor is configured to compare frequencies of the number of high power frequency components and to construct a single notch filter having a center frequency that corresponds to a frequency component having a largest power spectral amplitude and an expanded bandwidth that is greater than a predetermined bandwidth when the frequencies are within a threshold frequency range of each other.

8. The apparatus of claim 1, wherein the suppression selector is configured to count the number of high power frequency components in a Fourier transform of the speech signal that have a peak power greater than an average signal power and to select the suppression technique when the number of high power frequency components falls within a predetermined range.

9. A method, comprising: analyzing a speech signal to detect howling by; performing a time domain analysis of speech signals to identify a speech signal that may be exhibiting howling; and performing frequency domain analysis of the identified speech signal to confirm that the speech signal is exhibiting howling; and when howling is detected, selecting a howling suppression technique from a set of howling suppression techniques that includes at least two different howling suppression techniques, wherein selecting the howling suppression technique comprises selecting inter frame attenuation when a number of high power frequency components falls outside a predetermined notch filtering range, the selecting being based at least in part, on the analyzing of the speech signal; processing the speech signal according to the selected howling suppression technique; passing the processed speech signal to a receiving device; and if howling is not detected, passing the speech signal to the receiving device without performing a howling suppression technique on the speech signal.

10. The method of claim 9, wherein analyzing the speech signal is performed on a time domain representation of the speech signal and wherein howling is detected based on a level of symmetry of the time domain representation of the speech signal and a frequency domain analysis of speech signals determined to be symmetrical in the time domain.

11. The method of claim 9, wherein the selecting of a howling suppression technique comprises selecting from the set of howling suppression techniques that includes the inter frame attenuation and notch filtering.

12. The method of claim 9, wherein analyzing the speech signal comprises performing a fast Fourier transform (FFT) on the speech signal and counting the number of high power frequency components having a power greater than an average signal power and wherein the selecting comprises notch filtering when the number of high power frequency components falls within the predetermined notch filtering range.

13. The method of claim 9, further comprising constructing a bi-quadratic notch filter based, at least in part, on the analyzing of the speech signal if the selected howling suppression technique comprises notch filtering.

14. An integrated circuit device, comprising:
- a howling detector comprising processor-executable instructions stored on a non-transitory processor-readable medium for detecting howling in a speech signal by performing a time domain analysis of speech signals to identify a speech signal that may be exhibiting howling and performing frequency domain analysis of the identified speech signal to confirm that the speech signal is exhibiting howling;
- a suppression selector comprising processor-executable instructions stored on a non-transitory processor-readable medium for selecting a howling suppression technique based, at least in part, on the frequency domain analysis of the speech signal, and further comprising instructions for performing a fast Fourier transform (FFT) on the speech signal, counting a number of high power frequency components having a power greater than an average signal power, and selecting a howling suppression technique comprising notch filtering when the number of high power frequency components falls within a predetermined notch filtering range, and further wherein the suppression selector comprises instructions for selecting inter frame attenuation when the number of high power frequency components falls outside the predetermined notch filtering range;
- a signal processor configured to process the speech signal according to the selected howling suppression technique and passing the processed speech signal to a receiving device; and
- wherein if howling is not detected, the signal processor passes the speech signal to the receiving device without performing a howling suppression technique on the speech signal.

15. The integrated circuit device of claim 14, wherein the suppression selector comprises instructions for selecting of a howling suppression technique from a set of suppression techniques that includes attenuation and notch filtering.

16. The integrated circuit device of claim 14, further comprising a filter constructor comprising processor-executable instructions stored on a non-transitory processor-readable medium for constructing a bi-quadratic notch filter based, at least in part, on characteristics of the speech signal.

17. The integrated circuit device of claim 16, wherein the filter constructor comprises instructions for comparing frequencies of the number of high power frequency components and to construct a single notch filter having a center frequency corresponding to the lowest of the frequencies and an expanded bandwidth that is greater than the predetermined bandwidth when the frequencies are within a threshold frequency range of each other.

* * * * *